United States Patent [19]

Teufel

[11] 4,149,658
[45] Apr. 17, 1979

[54] PORTABLE DISPENSING DEVICE

[76] Inventor: George R. Teufel, 12345 NW. Barnes Rd., Portland, Oreg. 97220

[21] Appl. No.: 808,047

[22] Filed: Jun. 20, 1977

[51] Int. Cl.² .......................................... G01F 11/00
[52] U.S. Cl. .................................. 222/267; 222/276; 222/308; 222/361
[58] Field of Search ............... 222/267, 270, 275, 276, 222/308, 361, 362, 135, 137, 305, 426, 428, 438, 440, 445, 447

[56] References Cited

U.S. PATENT DOCUMENTS

| | | | |
|---|---|---|---|
| 260,373 | 7/1882 | Erwin | 222/523 X |
| 589,386 | 8/1897 | Gerhard | 222/361 X |
| 780,680 | 1/1905 | Peterson et al. | 222/361 X |
| 1,067,994 | 7/1913 | Lundin | 222/276 X |
| 1,931,975 | 10/1933 | Berzon | 222/276 |
| 2,046,089 | 6/1936 | Rebhahn | 222/361 |
| 2,639,837 | 5/1953 | Stockdale | 222/276 |

Primary Examiner—Stanley H. Tollberg
Assistant Examiner—Edward M. Wacyra
Attorney, Agent, or Firm—Eugene M. Eckelman

[57] ABSTRACT

A hopper has an elongated nozzle projecting from the bottom thereof and a manually operable metering assembly having discs which form first and second loading areas operates reciprocally through the hopper in an arrangement such that in one movement thereof a first loading area is filled and the second area is emptied and in the other movement thereof the second area is filled and the first area is emptied whereby a charge is dispensed in each inward and outward movement of the metering assembly. The loading areas are adjustable in size to vary the charges dispensed and the nozzle is also adjustable in length to accommodate persons of different stature as well as to suit different dispensing applications.

2 Claims, 3 Drawing Figures

PORTABLE DISPENSING DEVICE

BACKGROUND OF THE INVENTION

This invention relates to new and useful improvements in depensing devices.

Dispensing devices have heretofore been devised for dispensing fertilizer, such as for fertilizing trees, potted plants, and the like in nurseries or elsewhere. Such prior devices do not contain structure which makes for speedy and convenient application of fertilizer or the like for practically all types of uses. For example, structurally it is desired that the dispenser be light in weight so that it can be carried conveniently by a single person. Also, it is desired that the dispenser accurately dispense a uniform amount of fertilizer each time. It is further desired that the dispenser be capable of being operated so as to speedily fertilize closely spaced potted plants. Further yet it is desired that the dispenser have suitable adjustment so that the charges of fertilizer dispensed can be changed. Prior devices have been deficient in combining all these features for efficient operation.

SUMMARY OF THE INVENTION

According to the present invention and forming a primary objective thereof, a portable dispensing device is provided which overcomes the deficiencies of prior devices in that it is light in weight and compact for easy carrying and operation by a single person. The dispensing device accurately dispenses charges of material and operates at a fast speed through the medium of a reciprocating piston metering assembly which dispenses a charge with each of an inward and outward movement thereof. The device has an adjustable length nozzle for accommodating persons of different stature and for adjusting to different receiving means, and further adjustment is provided to change the size of charge being released.

The invention will be better understood and additional objects and advantages will become apparent from the following description taken in connection with the accompanying drawings.

DETAILED DESCRIPTION OF A PREFERRED EMBODIMENT

Figure 1:
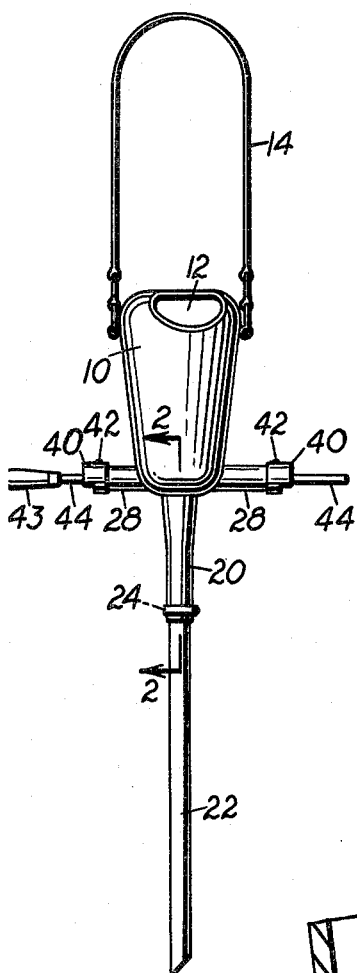
FIG. 1 is an elevational view of a portable dispensing device embodying the instant invention.
Figure 2:
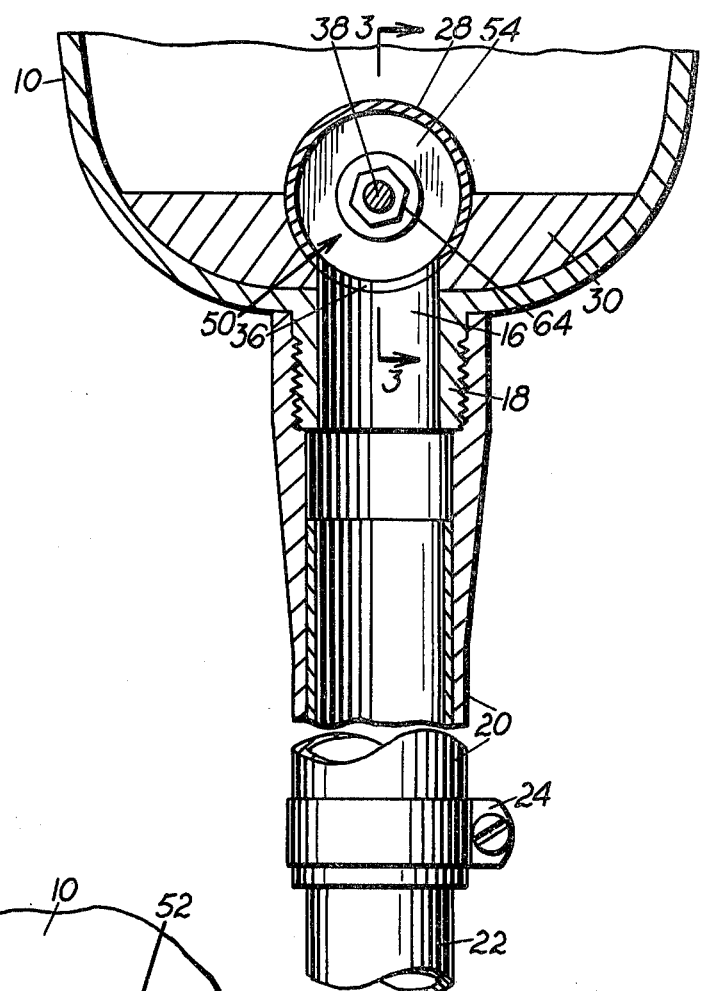
FIG. 2 is an enlarged foreshortened fragmentary sectional view taken on the line 2—2 of FIG. 1.

With particular reference to the drawings, the dispensing device of the instant invention comprises a hopper or container portion 10 having a top filler opening 12 and a carrying strap or harness 14 by means of which the device can be supported on the person. The bottom of the hopper 10 has an outlet 16, and a hollow neck portion 18 at such outlet threadedly supports a tubular extension 20. An elongated spout 22 is received in the extension 20 in telescoping relation and by adjustment of the spout in the extension 20, a person who is operating the dispenser can extend the nozzle to suit his stature and also to suit the means which receive the fertilizer. A releasable clamp 24 is mounted on the lower end of extension 20 to allow adjustment of the spout when desired but otherwise it holds the spout in a set position.

A tubular member 28 which forms a part of metering means, extends laterally across the bottom of the hopper 10 in integrated relation, and together with a built up bottom portion 30 or other suitable means forms the bottom of the hopper. Member 28 has a pair of laterally spaced top apertures 32 and 34 within the hopper, and an aperture 36 is provided centrally in the member 28 at the bottom thereof. Aperture 36 communicates with the outlet 16.

Tubular member 28 projects outwardly beyond both sides of the hopper 10 and has a threaded rod 38 extending therethrough. This rod passes freely through end caps 40 removably held in place by screws 42 and is provided with a handle 43 on one end. Protective sleeves 44 are secured on the rod at the ends.

Figure 3:
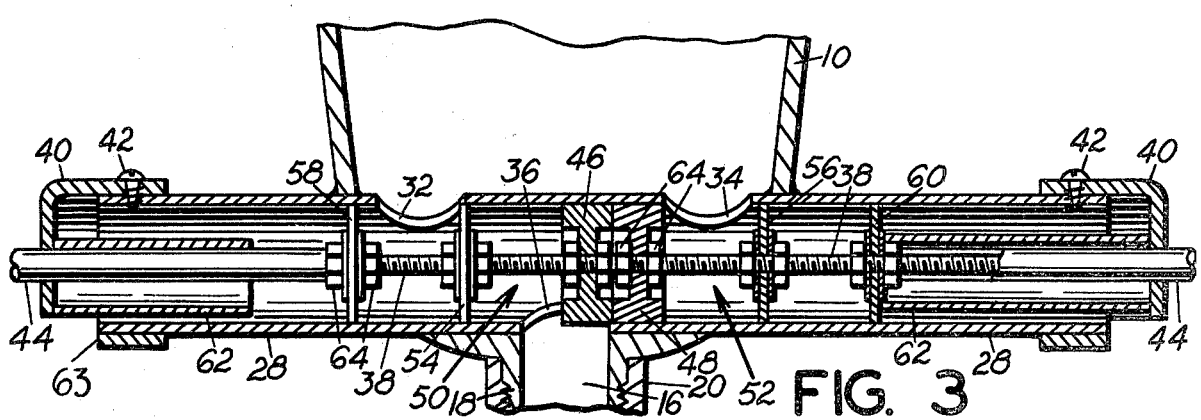
FIG. 3 is a fragmentary sectional view taken on the line 3—3 of FIG. 2.

With particular reference to FIG. 3 rod 38 forms a part of a metering piston assembly and supports a pair of central discs 46 and 48 which form loading areas 50 and 52 with respective outwardly spaced discs 54 and 56 also supported on the rod 38. Discs 54 and 56 are in turn associated with outwardly spaced discs 58 and 60, respectively, providing end walls for the metering mechanism.

The loading areas 50 and 52 are arranged in association with the respective inlet apertures 32 and 34 as well as with the outlet aperture 36 such that when the piston assembly is moved in one direction, one of the loading areas is in communication with its inlet aperture for filling and the other loading area is in communication with the outlet aperture 36 for emptying. For example, in FIG. 3 the piston assembly has been pushed in by the handle 43 to cause the loading area 50 to leave the inlet aperture 32 and to empty through aperture 36. Loading area 52 in this position is being filled. Conversely, when the handle 43 is pulled outwardly loading area 52 empties and loading area 50 fills. Stop sleeves 62 are supported loosely on each end of the rod 38 between the end caps 40 and the end discs 58 and 60 to limit the reciprocating movements of the rod.

Outer discs 58 and 60 merely form end walls for the piston assembly and are disposed outwardly of the respective inlet apertures at all times. The area between such outer discs and their respective adjacent discs 54 and 56 will initially fill and remain full and the material therein will merely move back and forth with the piston assembly. In order to prevent jamming of the piston assembly in the event that some material being dispensed escapes past the outer discs 58 and 60, end caps 40 have a bottom cutout portion 63 which allows such escaped material to drop out the ends of the tubular member.

Figure 4:
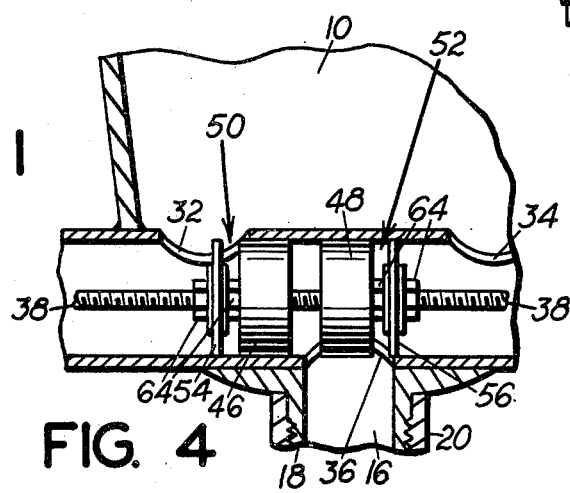
FIG. 4 is a fragmentary view similar to FIG. 3 but showing a different set position of metering means.

All of the discs on the threaded rod 38 are held in place by pairs of nuts 64, and such arrangement provides for selected positioning of the discs so that the loading areas 50 and 52 can be adjusted in their volumetric capacity to deposit selected charges of material through the outlet. In FIG. 3 the discs are adjusted to provide relatively large loading areas 50 and 52 and in FIG. 4 the discs are adjusted to provide relatively small loading areas.

In accordance with the present invention, a workman can support the dispenser on his body by means of the strap 14 and by suitably gripping the device with one hand for support and operating the handle 43 with the other hand, selected amounts of material can be deposited in a rapid and convenient manner by reciprocating movements of the handle, a charge of material being released in each of the inward and outward movement of the handle. The device is light in weight and in addition to having suitable adjustments for depositing selected sizes of material, the spout 22 can be adjustably lengthened or shortened to suit the particular person or the purpose for which the device is being used.

It is to be understood that the form of my invention herein shown and described is to be taken as a preferred example of the same and that various changes in the shape, size and arrangement of parts may be resorted to without departing rrom the spirit of my invention, or the scope of the subjoined claims.

Having thus described my invention, I claim:

1. A portable dispensing device comprising
   (a) a hopper portion for holding a supply of material to be dispensed,
   (b) an outlet at the bottom of said hopper portion,
   (c) a nozzle on said hopper portion extending downwardly from said outlet for directing dispensed material to a selected area,
   (d) a tubular member extending laterally through said hopper portion thereof,
   (e) said tubular member having downwardly directed opening means communicating with said outlet,
   (f) said tubular member having upwardly directed opening means communicating with said hopper portion for receiving material to be dispensed through said tubular member and said outlet,
   (g) a rod extending through said tubular member and mounted for reciprocating movement therein,
   (h) a laterally extending handle on said rod projecting from said tubular member for manual operation of said rod in its reciprocating movement, and
   (i) spaced disc means on said rod forming first and second loading areas arranged to receive a pair of metered charges from said hopper through said opening means on said tubular member,
   (j) said rod being arranged in one movement thereof to fill said first loading area from said opening means and at the same time empty a load from said second loading area out said outlet and in the other movement thereof to fill said second loading area from said opening means and at the same time empty a load from said first loading area whereby a charge is dispensed in each direction of movement of said rod,
   (k) said disc means being adjustable on said rod to vary the volume of said loading areas.

2. The dispensing device of claim 1 wherein said opening means comprises a pair of spaced openings associated with respective loading areas, said disc means comprising a first pair of discs associated with a first of said openings and a second pair of discs associated with a second of said openings.

* * * * *